United States Patent [19]
Merritt

[11] 3,987,890

[45] Oct. 26, 1976

[54] DIRECTIONAL CONTROL APPARATUS FOR A BALE THROWER

[75] Inventor: John H. Merritt, Ephrata, Pa.

[73] Assignee: Sperry Rand Corporation, New Holland, Pa.

[22] Filed: Mar. 31, 1976

[21] Appl. No.: 672,369

[52] U.S. Cl. ............................... 198/316; 198/317; 198/641; 214/42 A
[51] Int. Cl.² .......................................... B65G 31/02
[58] Field of Search .................. 198/6, 88, 92, 112, 198/128, 125; 214/42 R, 42 A

[56] References Cited
UNITED STATES PATENTS

| | | | |
|---|---|---|---|
| 2,762,517 | 9/1956 | Eberly | 214/42 A |
| 2,910,191 | 10/1959 | Sullinger | 198/92 X |
| 2,960,208 | 11/1960 | Sibley et al. | 198/112 X |
| 3,055,519 | 9/1962 | Hollyday | 198/125 X |
| 3,105,602 | 10/1963 | Hollyday | 198/125 X |
| 3,166,204 | 1/1965 | De Buhr | 198/128 X |
| 3,176,829 | 4/1965 | Wathen | 198/128 |
| 3,198,356 | 8/1965 | Muehlhausen | 198/128 X |
| 3,308,926 | 3/1967 | James | 198/128 |
| 3,738,509 | 6/1973 | Yatcilla et al. | 214/42 A |

*Primary Examiner*—Johnny D. Cherry
*Assistant Examiner*—Richard K. Thomson
*Attorney, Agent, or Firm*—John R. Flanagan; Frank A. Seemar; Michael R. Swartz

[57] ABSTRACT

An improved directional control apparatus for a bale thrower on a baler includes an elongated arm pivotally mounted at one end to a side of the bale case of the baler and extending generally across and under the end of the thrower being pivotally mounted to the discharge end of the bale case for side-to-side lateral swinging movement. The control apparatus also includes a hydraulic cylinder interconnecting the bale case and the free end of the elongated arm and means for slidably interconnecting the arm to the thrower such that upon actuation of the hydraulic cylinder to pivot the arm, the interconnection established between the arm and the thrower by the slidable means will cause the thrower to also pivot or laterally swing and thereby vary the direction in which bales will be thrown away from the baler by the thrower.

12 Claims, 11 Drawing Figures

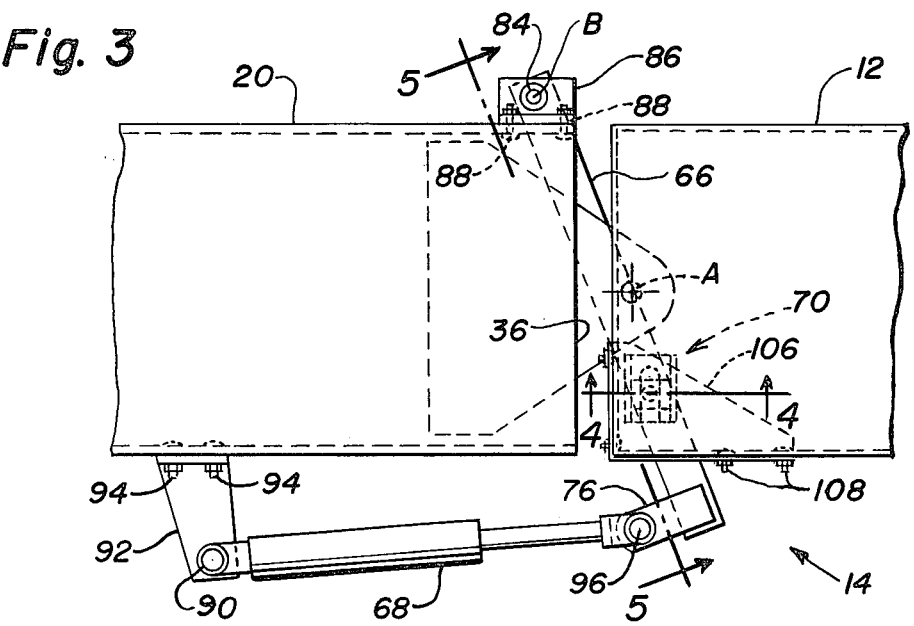
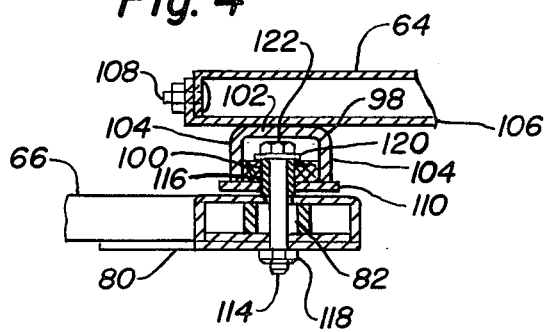
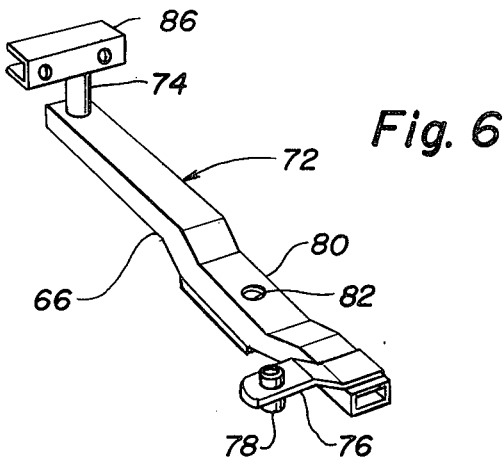
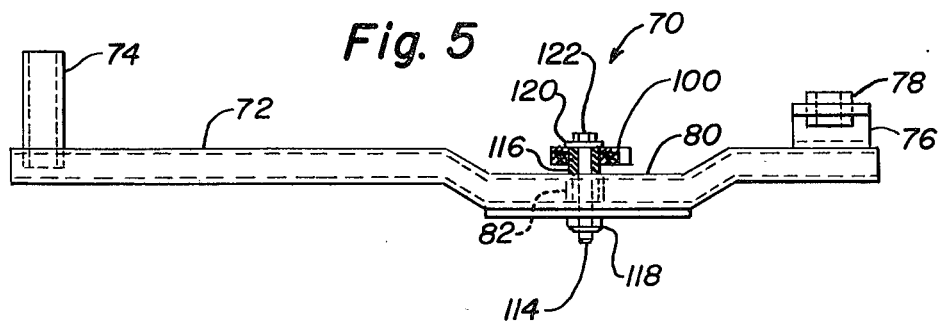

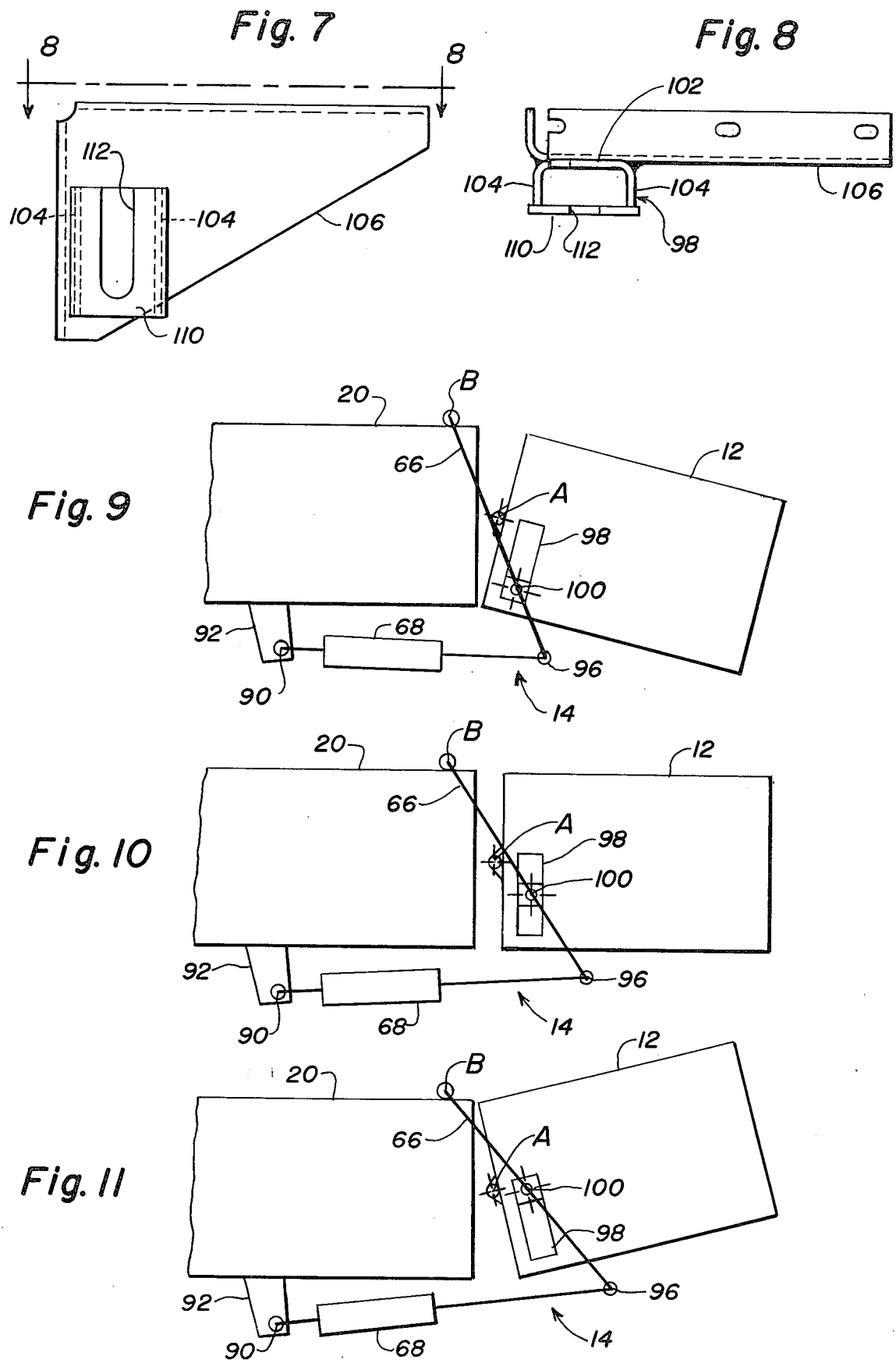

3,987,890

DIRECTIONAL CONTROL APPARATUS FOR A BALE THROWER

BACKGROUND OF THE INVENTION

1. Field of the Invention

The present invention relates generally to the art of handling bales and, more particularly, is concerned with an improved directional control apparatus for a bale thrower mounted on the bale case of a baler.

2. Description of the Prior Art

Heretofore, a bale thrower has been provided which is mounted on the rear or discharge end of a fore-and-aft extending bale case of a baler. Successive bales discharged from the baler are deposited in the thrower and then thrown thereby away from the baler, commonly into a trailing wagon.

When the baler is in operation in a field, the tractor operator guides the baler such that it follows the windrow of hay which is lying on the field and is picked up and baled. Frequently, changes must be made by the operator in the direction of travel of the baler, such as in turning the baler around at the end of the field or when following a windrow which extends in a curved path along a hillside of the field. When the baler changes course, the longitudinal axis of its fore-and-aft extending bale case shifts relative to the longitudinal axis of the trailing wagon. Therefore, to compensate for such change, the bale thrower is commonly pivotally mounted for lateral swing movement on the bale case.

Directional control apparatus has heretofore been provided being connected between the thrower and the baler and which upon acutation effectuates or causes lateral swinging movement of the thrower relative to the bale case for varying the direction in which bales are thrown or trajected away from the baler relative to the direction of travel of the baler. By use of such apparatus, the bale thrower may be aimed at the trailing wagon and bales being thrown by the thrower will be trajected along a path appropriate to deposit them into the wagon even through the course of travel of the baler has turned relative to the wagon.

One directional control apparatus heretofore devised utilizes an elongated arm which is pivotally mounted at one end portion about a vertical axis to one side of the bale case adjacent the bale discharge end thereof and forwardly of one side of the bale thrower. The arm extends under and transversely across the bale case just forwardly of the discharge end thereof to an opposite end portion located adjacent the opposite side of the bale case and forwardly of the opposite side of the thrower. The apparatus also includes an elongated rod which is pivotally connected at its rear end to the opposite end portion of the arm and extended longitudinally forward along the side of the baler toward the forward end thereof where it is connected to the piston rod end of a hydraulic cylinder mounted along the forward side of the baler. Still further, a fore-and-aft extending link is provided being pivotally connected at its forward end to an intermediate portion of the elongated arm and its opposite rear end to the thrower. The link provides the interconnection between the thrower and the arm through which the pivotal movement of the arm, being produced via the longitudinal movement of the elongated rod upon actuation of the hydraulic cylinder, is transmitted to the thrower to produce lateral swinging movement thereof for varying the direction in which bales are thrown away from the baler and toward the trailing wagon by the thrower.

While the above-described prior art directional control apparatus is generally satisfactory for accomplishing its intended purpose, a more compact and durable arrangement is desirable to enhance the overall performance and stability of the thrower.

SUMMARY OF THE INVENTION

The directional control apparatus of the present invention improves the overall performance and stability of the bale thrower, especially under those conditions where lateral swinging of the thrower relative to the baler is required such as when operating the baler on hilly terrain and during end-of-field turns. Particularly, the number of pivotal connections or joints between the various parts of the prior art control arrangement have been reduced in the improved apparatus. As a result, in the latter apparatus the amount of looseness or "slop" due to inherent clearances at the joints as well as progressive wear between pivotally joined parts, which was present in the prior art arrangement, has now been reduced and thereby the accuracy of the control apparatus in aiming the thrower in a particular desired direction has been increased. Also, reduction in the amount of "slop" in the components of the apparatus minimizes the tendency for undesirable side-to-side oscillations or vibrations to be induced into the apparatus when the thrower is empty between periods of use during normal travel of the baler in operation across the field or in transport along a road. The frequent occurrence of such oscillations will shorten the life of certain parts of the bale thrower and hasten the time when repair or replacement of the parts will be necessary.

Accordingly, the present invention is directed to an improved directional control apparatus for a bale thrower on a baler. The baler has a bale case with a bale discharge end and the bale thrower is mounted on the base case at the discharge end thereof for lateral swinging movement relative to the bale case. The bale thrower is operable to receive bales from the bale case discharge end and throw them away from the baler.

The improved control apparatus includes an elongated arm pivotally mounted at one end to a side of the bale case adjacent one side of the thrower. The arm extends generally across and under the thrower to an opposite end portion located at an opposite side of the thrower. Actuatable mechanism, preferably in the form of a hydraulic cylinder, interconnects the baler and the opposite or free end portion of the arm. Means is provided for slidably interconnecting the arm to the thrower at an intermediate portion of the arm such that upon actuation of the hydraulic cylinder to pivot the arm, the interconnection established between the arm and the thrower by the slidable means will cause the thrower to also pivot or laterally swing and thereby vary the direction in which bales will be thrown away from the baler by the thrower.

More particularly, the slidable means includes first means defining a track on the thrower and second means mounted on the intermediate portion of the arm and defining a follower which is slidable along the first track-defining means as the arm is pivoted. The first means is preferably in the form of a U-shaped channel member affixed to the bottom side of the thrower, while the second means is preferably in the form of a rectangular block which is rotatably mounted to the upper side of the intermediate portion of the arm located below the thrower and received within the track defined by the U-shaped channel member. The track extends in a generally transverse relationship to both the arcuate path along which the track moves as the bale thrower pivots and the arcuate path along which the follower block moves as the arm pivots such that pivoting of the arm will force pivoting of the thrower via the interconnection provided between the arm and the thrower by the sides of the block being confined between the sides of the channel member track, while at the same time the block slides along the track so as to allow the block and track to revolve about the respective separate vertical pivotal axes of the arm and the thrower.

Other advantages and attainments of the present invention will become apparent to those skilled in the art upon a reading of the following detailed description when taken in conjunction with the drawings in which there is shown and described an illustrative embodiment of the invention.

BRIEF DESCRIPTION OF THE DRAWINGS

In the course of the following detailed description reference will be frequently made to the attached drawings in which:

FIG. 3 is a fragmentary top plan view showing the improved directional control apparatus connected with the bale thrower and the discharge end of the bale case;

FIG. 4 is an enlarged sectional view taken along line 4—4 of FIG. 3;

FIG. 5 is a side elevational view taken along line 5—5 of FIG. 4, showing the pivotal arm and also the slide block and spacer mounted thereon being shown in section;

FIG. 6 is a perspective view of the pivotal arm of FIG. 5, also showing its bracket for pivotally mounting the arm to the bale case;

FIG. 7 is an enlarged bottom plan view of the corner bracket attached to the bale thrower as shown in FIG. 3, showing a channel member of the improved directional control apparatus which receives and is coupled with the slide block of FIG. 5;

FIG. 8 is a side elevational view taken along line 8—8 of FIG. 7; and

FIGS. 9 through 11 are generally diagrammatic top plan views showing the bale thrower in three different positions relative to the bale case as a result of actuation of the improved control apparatus.

DETAILED DESCRIPTION OF THE INVENTION

In the following decription, right hand and left hand references are determined by standing at the rear of the machine and facing in the direction of forward travel. Also, in the following description, it is to be understood that such terms as "forward," "left," "upwardly," etc. are words of convenience and are not to be construed as limiting terms.

IN GENERAL

Figure 1:
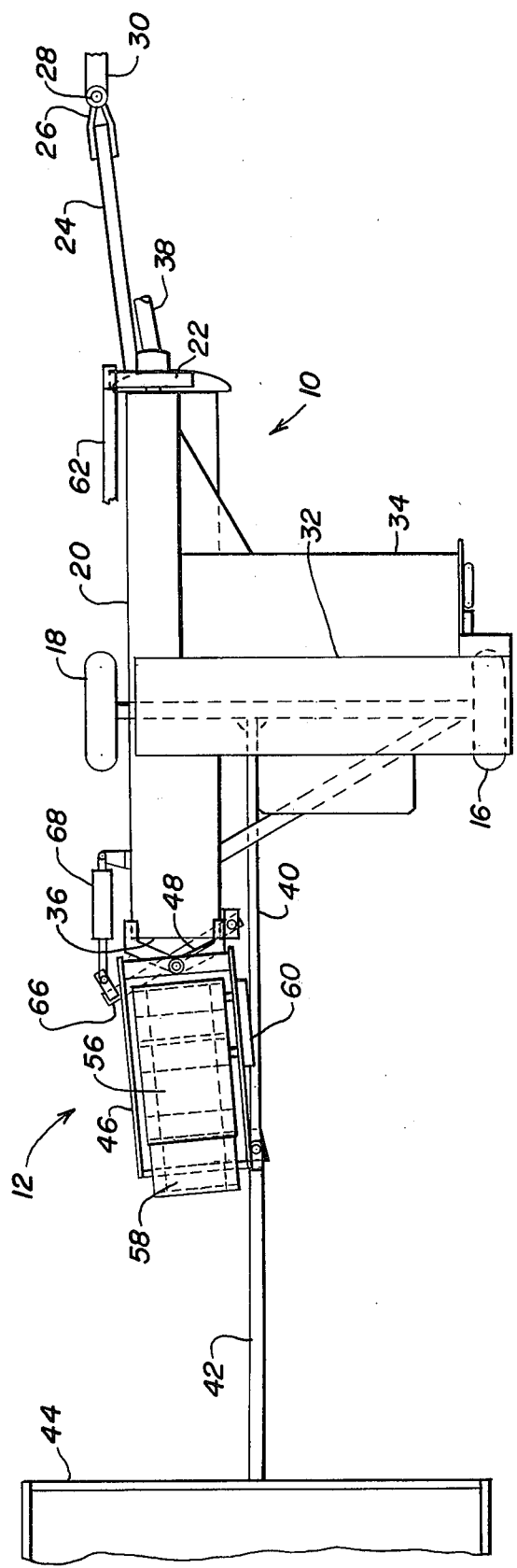
FIG. 1 is a generally diagrammatic top plan view showing a hay baler, the forward end of a wagon trailing behind the baler and a bale thrower mounted on the bale case of the baler to receive bales therefrom and traject them to the wagon, the operative position of the thrower being controlled by the improved direcional control apparatus of the present invention.
Figure 2:
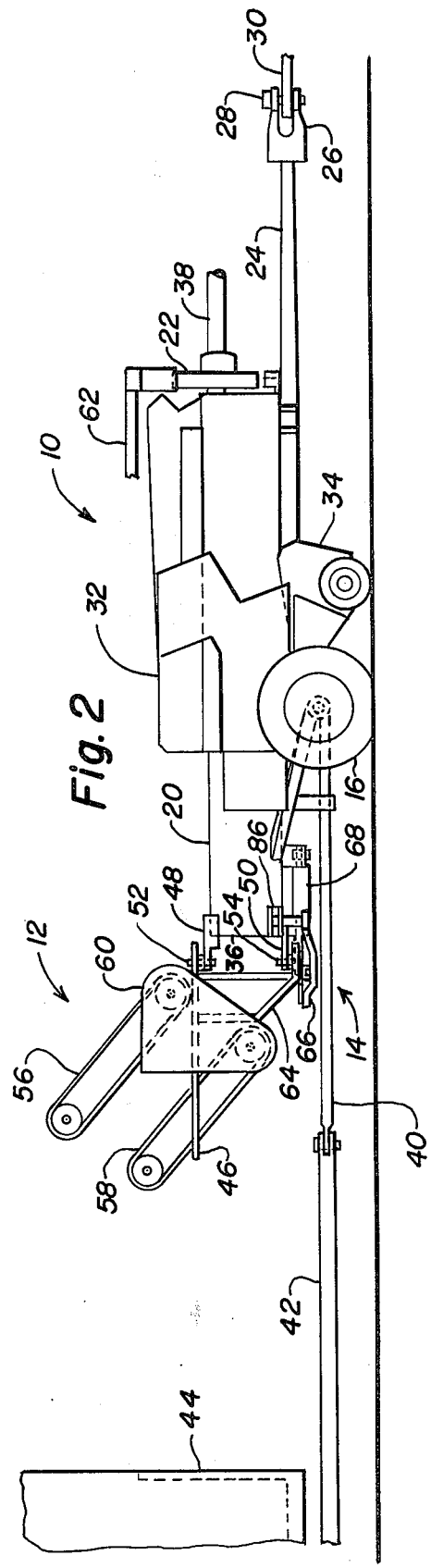
FIG. 2 is a side elevation of FIG. 1.

Referring now to the drawings, and particularly to FIGS. 1 and 2, there is shown a hay baler, being indicated generally by the numeral 10, with a bale thrower, generally designated 12, mounted at the rear of the baler and an improved directional control apparatus, generally designated 14, connecting the baler 10 and the thrower 12.

The baler 10 is supported and made mobile by right and left rotatably mounted ground-engaging wheels 16,18 and includes a fore-and-aft extending bale case 20 at its left side having a forward end on which a flywheel 22 is rotatably mounted and forwardly from which extends a pivotally mounted tongue 24 provided with a clevis 26. When the clevis 26 of its tongue 24 is articulately connected by a hitch pin 28 with a drawbar 30 of a tractor (not shown), the baler 10 may be towed across a field along a windrow of hay.

The baler 10 further includes a feeder housing 32 transversely mounted adjacent the right side of the bale case 20 within which is mounted a conventional feeding mechanism (not shown) operable to convey crop material into the bale case 20 through an inlet opening therein (not shown). A conventional pickup assembly 34 mounted forwardly of and below the feeder housing 32 is operable to lift crop material, such as hay or the like, from the field and deliver it to the feeding mechanism.

A conventional plunger (not shown) is mounted for fore-and-aft reciprocable movement in the bale case 20 for forming the crop material conveyed therein through the bale case inlet opening into rectangular bales. As the bales are formed in the bale case 20, they move progressively toward the rear or discharge end 36 of the bale case 20. After each bale is completed, it is banded with a suitable tying medium and, subsequently, emerges from the discharge end 36 of the bale case 20.

An input driveline 38, being connected at its rear end to the baler flywheel 22, is adapted for connection at its forward end to the power take-off (pto) shaft of the tractor (not shown) for rotation in unison therewith to supply rotary driving power to the operating components of the baler 10 through additional conventional power transmitting components (not shown).

The baler 10 also has a rearwardly extending drawbar 40 to which a tongue 42 of a wagon 44 is connected. A vertical pin 44 provides a pivotal connection between the wagon tongue 42 and the baler drawbar 40 so that they are free to pivot relative to each other responsive to changes in the direction of travel of the baler 10.

The wagon 44 is towed behind the baler 10 to receive the completed bales. For trajecting or throwing completed bales from the baler and into the wagon, a bale thrower 12 is provided.

The bale thrower 12 includes a frame structure 46 mounted on the discharge end 36 of the bale case 20. Upper and lower mounting bracket 48,50 are respectively attached to and rearwardly extend from the upper and lower sides of the bale case 20 at the discharge end thereof. Vertically aligned pivot elements 52,54 connect a forward end portion of the thrower frame structure 46 at approximately the center thereof to the upper and lower mounting brackets 48,50 so as to permit the thrower frame structure 46 to swing laterally relative to the bale case about a vertical axis A defined by the elements 52,54 whereby the direction in which bales are thrown or trajected from the baler 10 can be varied.

The thrower frame structure 46 carries trajecting means, preferably in the form of a pair of cooperative upper and lower endless belts 56,58 which are spaced apart a distance substantially equal to the vertical thickness of the bales discharged from the bale case 20. While a belt-type thrower mechanism is illustrated in the preferred embodiment, the improved directional control apparatus of the present invention is not limited solely to use in conjunction with such type of thrower mechanism. The improved control apparatus is equally suitable for use with other types of bale throwing mechanisms.

As shown in FIG. 2, the belts 56,58 extend upwardly and rearwardly. They are spaced rearwardly from the discharge end 36 of the bale case 20 such a distance that each bale to be thrown is substantially clear of the bale case 20 before engagement with the belts. Conventional drive means 60 being drivingly interconnected by suitable power transmitting components 62 with the aforementioned input driveline 38 of the baler 10 provides the rotary power necessary to drive the belts in the respective directions indicated by the arrows and at high speed. As each bale is discharged, it slides across a bottom guide plate 64 on the thrower frame structure 46 extending from the trajecting belts 56,58 to the discharge end 36 of the bale case 20. As each bale emerges, it travels toward the lower belt 56 and beneath the upper belt 58. On engagement with the lower belt 56, the bale is lifted into engagement with the upper belt 58, whereupon both belts traveling at high speed cooperate to speed up the bale's rearward travel and to traject the bale away from the baler 10 and into the trailing wagon 44.

IMPROVED DIRECTIONAL CONTROL APPARATUS

In order to control the position of the bale thrower 12 relative to the fore-and-aft longitudinal axis of the bale case 26 so that the discharged bales will be thrown toward the trailing wagon 44 even though the baler is making a turn relative to the wagon, an improved directional control apparatus 14 is provided being operably connected to the bale case 20 and the bale thrower 12.

As seen in FIG. 3, the control apparatus 14 for laterally swinging the bale thrower 12 to, and holding it at, any desired position between the extreme turn and right turn side positions, being respectively illustrated schematically in FIGS. 10 and 12, basically includes an elongated arm 66 pivotally mounted on a inboard side of the bale case 20, actuatable means, preferably, in the form of hydraulic cylinder 68 interconnecting the arm 66 and the bale case 20, and slide means, generally designated 70, interconnecting the arm 66 and the thrower 12.

The arm 66 includes an elongated body 72 having an upright sleeve 74 fixed at one end portion thereof and a forwardly-protruding tab 76 fixed on an opposite end portion thereof with a vertically-disposed sleeve 78 on the tab 76. An intermediate portion 80 of the body 72 is downwardly offset from the remainder of the body 72 and has a central bore 82 extending vertically therethrough.

The elongated arm 66 is pivotally mounted at its one end portion about a vertical axis B to the bale case 20 and adjacent the right side of the thrower 12 and therefrom extends generally horizontally and transversely or somewhat diagonally across and under the forward end portion of the thrower 12 to its opposite end portion located at the left or opposite side of the thrower 12. Specifically, the upright sleeve 74 on the one end portion of the arm 66 receives a pivot pin 84 which defines the vertical pivot axis B of the arm 66 and is affixed to and depends from a short channel-like bracket 86 which is fastened to the right or inboard side of the bale case 20 by bolts 88 at its discharge end 36.

The hydraulic cylinder 68 extends along the left or outboard side of the bale case 20 and is pivotally anchored at its cylinder end at 90 to an outwardly projecting bracket plate 92 which is attached to the left side of the bale case 20 by bolts 94. The piston rod end of the cylinder 68 is pivotally attached at 96 to the sleeve 78 on the tab 76 on the opposite end portion of the arm 66. The cylinder 68 is operated by suitable control means (not shown) on the tractor through use of the tractor hydraulics to which the cylinder is connected by suitable hydraulic lines (not shown).

The slide means 70 which interconnects the arm 66 and the thrower 12 is disposed between the upper side of the arm 66 and the lower side of the bottom guide plate 64 of the thrower 12, being specifically located above the downwardly offset, intermediate portion 80 of the arm 66. The slide means 70 basically includes first means in the form of a channel member 98 being U-shaped in cross section and defining a track on the thrower 12 and second means in the form of a rectangular block 100, made of fiber or other suitable material, being mounted on the intermediate portion 80 of the arm 66 and defining a follower which is received within and slidable along the track-defining channel member 98 as the arm 66 is pivoted about its vertical axis B by actuation of the hydraulic cylinder 68.

Referring to FIGS. 7 and 8, the first means of the slide means 70, that being the U-shaped channel member 98, includes a base 102 which merges at its opposite sides into downwardly-extending spaced apart legs 104. The aforementioned track is defined between the respective interior surfaces of the legs 104. The base 102 is welded or otherwise suitably attached to the underside of a triangular-shaped bracket 106 which is disposed below and connected to the forward left corner of the bottom guide plate 64 of the thrower 12 by bolts 108, as best seen in FIG. 3. A flat plate 110 bridges and is fixed to the legs 104 of the channel member 98 and has an elongated slot 112 defined therein which opens at the left side of the plate 110 and extends in alignment with the track defined between the legs 104.

Turning now to FIGS. 4 and 5, the second means of the slide means 70 which includes the block 100, also includes a bolt 114 and a spacer 116 for rotatably attaching the block 100 to the arm 66. Specifically, the block 100 is rotatably mounted above the upper side of the downwardly-offset intermediate portion 80 of the elongated arm 66 by the bolt 114 which passes through the bore 82 defined through the arm portion 80 and has the spacer 116 fitted thereon about which is received the block 100. A nut 118 is adjustably tightened on a lower threaded portion of the bolt 114 so as to clamp the spacer 116 between the upper side of arm portion 80 and a washer 120 which underlies the head 122 of the bolt 114. The spacer 116 is sufficiently greater in length than the thickness of the block 100 and has a diameter less than the width of the slot 112 defined in the flat plate 110 such that the spacer 116 may be inserted within the slot with the block 100 positioned above the plate 110 and between and in slidable engagement with the interior surfaces of the legs 104 of the channel member 98. In such manner, the inner portions of the plate 110 which define the slot 112 will extend between the lower side of the block 100 and the upper side of the intermediate arm portion 80.

Referring again to FIG. 4, it will be apparent that the track defined by the channel member 98 extends in a generally transverse relationship to both the arcuate path along which the track moves as the bale thrower 12 pivots and the separate arcuate path along which the follower block 100 moves as the arm 66 pivots. Therefore, pivoting of the arm 66 will force pivoting of the thrower 12 via the interconnection provided between the arm and the thrower by engagement between the sides of the block and the interior surfaces of the legs 104 of the channel member 98, while at the same time the block 100 will side along the track so as to accommodate revolution of the block 100 and channel member 98 about the respective separate vertical pivotal axes of the arm 66 and the thrower 12.

OPERATION OF THE IMPROVED DIRECTIONAL CONTROL APPARATUS

FIG. 10 schematically illustrates the desired centered position of the bale thrower 12 relative to the bale case 20 when the baler and the trailing wagon are traveling across the field in general longitudinal alignment. FIGS. 9 and 11 represent the left and right maximum angular positions to which the thrower 12 may be laterally swung relative to the bale case 20 for maintaining the thrower 12 in general alignment with the trailing wagon when the baler is turning respectively toward the left and right of the wagon's direction of travel. Also, it may be desirable to laterally swing the thrower 12 to any particular angular position between the left and right extremes merely for the purpose of achieving better lateral distribution of the bales between the sides of the trailing wagon.

Operation of suitable controls located on the towing tractor to cause retraction of the hydraulic cylinder 68 from its FIG. 10 toward its FIG. 9 condition pivots the arm 66 clockwise and thereby causes the thrower 12 to also pivot clockwise due to forces transmitted thereto from the intermediate portion 80 of the pivoting arm 66 through the bolt 114 and block 100 to the forward side of the block 100 and against the forward one of the pair of legs 104 of the channel member 98 fixed to the underside of the thrower 12. As the arm 66 and the thrower 12 both pivot clockwise about their respective separate axes B and A, the block 100 slides toward the left side of the thrower 12 within the track defined by the channel member 98 and concurrently rotates in a clockwise direction about the bolt 114 relative to arm 66 from the position of the block 100 shown in FIG. 10 toward that shown in FIG. 9. On the other hand, operation of the tractor-mounted controls to cause extension of the hydraulic cylinder 68 from its FIG. 10 toward its FIG. 11 condition pivots the arm 66 counterclockwise and thereby causes the thrower 12 to also pivot counterclockwise due to forces transmitted thereto from the intermediate portion 80 of the pivoting arm 66 through the bolt 114 and block 100 to the rearward side of the block 100 and against the rearward one of the pair of legs 104 of the channel member 98 fixed to the underside of the thrower 12. As the arm 66 and the thrower 12 both pivot counterclockwise about their respective separate axes B and A, the block 100 slides toward the right side of the thrower 12 within the track defined by the channel member 98 and concurrently rotates in a counterclockwise direction about the bolt 114 relative to the arm 66 from the position of the block 100 shown in FIG. 10 toward that shown in FIG. 11.

The degree of displacement of the block 100 illustrated in FIGS. 9 and 11 from its centered position in FIG. 10 has been exaggerated in the FIGS. 9 and 11 in order to effectively illustrate the fact that the block 100 does slide along the track of the channel member 98 upon pivoting of the arm 66 to cause pivoting of the thrower 12.

It is thought that the improved directional control apparatus of the present invention and many of its attendant advantages will be understood from the foregoing description and it will be apparent that various changes may be made in the form, construction and arrangement of the parts of the apparatus described without departing from the spirit and scope of the invention or sacrificing all of its material advantages, the form hereinbefore described being merely a preferred or exemplary embodiment thereof.

Having thus described the invention, what is claimed is:

1. An improved directional control apparatus for a bale thrower on a baler, said baler having a bale case with a bale discharge end, said bale thrower being mounted on said bale case at said discharge end thereof for lateral swinging movement relative to said bale case about a first axis and for receiving bales from said bale case discharge end and throwing them away from said baler, said improved directional control apparatus comprising:
   an elongated arm pivotally mounted at one end portion about a second axis to said bale case being displaced from said first axis and located adjacent one side of said thrower, said arm extending generally transversely across said thrower to an opposite end portion located at an opposite side of said thrower;
   mechanism interconnecting said baler and said opposite end portion of said arm and being actuatable for causing pivoting of said arm about said second axis relative to said bale case; and
   means mounted to one of said thrower and an intermediate portion of said arm and slidably connected to the other of said thrower and said intermediate arm portion such that an interconnection is established between said arm and said thrower which will cause said thrower to laterally swing about its said first axis as said arm is pivoted about its said second axis for varying the direction in which bales are thrown away from said baler by said thrower.

2. The apparatus as recited in claim 1, wherein said interconnection means includes:
   first means on said thrower defining a track; and
   second means mounted on said intermediate portion of said arm defining a follower being slidable along said track.

3. The apparatus as recited in claim 2, wherein said track defined by said first means extends in a generally transverse relationship to the arcuate paths in which said thrower and arm pivot about their respective first and second axes.

4. The apparatus as recited in claim 2, wherein:
   said first means includes a pair of spaced apart, generally parallel, elongated structures attached to said bale thrower and having interior facing surfaces which define said track; and said second means is received between and slidable relative to said elongated structures.

5. The apparatus as recited in claim 4, wherein said second means defining said follower is in the form of a generally rectangular block which is rotatably mounted on said intermediate portion of said arm.

6. The apparatus as recited in claim 5, wherein said block at its opposite sides slidably engages said interior facing surfaces of said elongated structures of said first means.

7. The apparatus as recited in claim 5, wherein said first means is in the form of an elongated channel member being generally U-shaped in cross section and having spaced apart legs which comprises said elongated structures.

8. An improved directional control apparatus for a bale thrower on a baler, said baler having a bale case with a bale discharge end, said bale thrower being mounted on said bale case at said discharge end thereof for lateral swinging movement relative to said bale case and for receiving bales from said bale case discharge end and throwing them away from said baler, said improved directional control apparatus comprising:

an elongated arm pivotally mounted at one end portion to said bale case adjacent one side of said thrower and extending generally transversely across and under said thrower to an opposite end portion located at an opposite side of said thrower;

means slidably interconnecting an intermediate portion of said arm underlying said thrower to said thrower; and mechanism interconnecting said baler and said opposite end portion of said arm and being actuatable for causing pivoting of said arm and through said interconnecting means lateral swinging movement of said thrower for varying the direction in which bales are thrown away from said baler by said bale thrower.

9. The apparatus as recited in claim 8, wherein said intermediate portion of said arm is offset away from said thrower and relative to the remainder of said arm and said interconnecting means is disposed between said thrower and said arm above said offset intermediate portion thereof.

10. The apparatus as recited in claim 8, wherein said interconnecting means includes:

first means on said thrower defining a track; and second means mounted on said intermediate portion of said arm and defining a follower being slidable along said track.

11. The apparatus as recited in claim 10, wherein said track defined by said first means extends in a generally transverse relationship to the arcuate paths in which said thrower and arm pivot.

12. The apparatus as recited in claim 10 wherein:

said first means is in the form of an elongated channel member being generally U-shaped in cross section and having spaced apart legs which define said track; and said second means defining said follower is in the form of a generally rectangular block which is received between and slidable relative to said legs of said channel member.

* * * * *